D. M. McDONALD.
HANDLE.
APPLICATION FILED JULY 10, 1919.
1,315,376.    Patented Sept. 9, 1919.
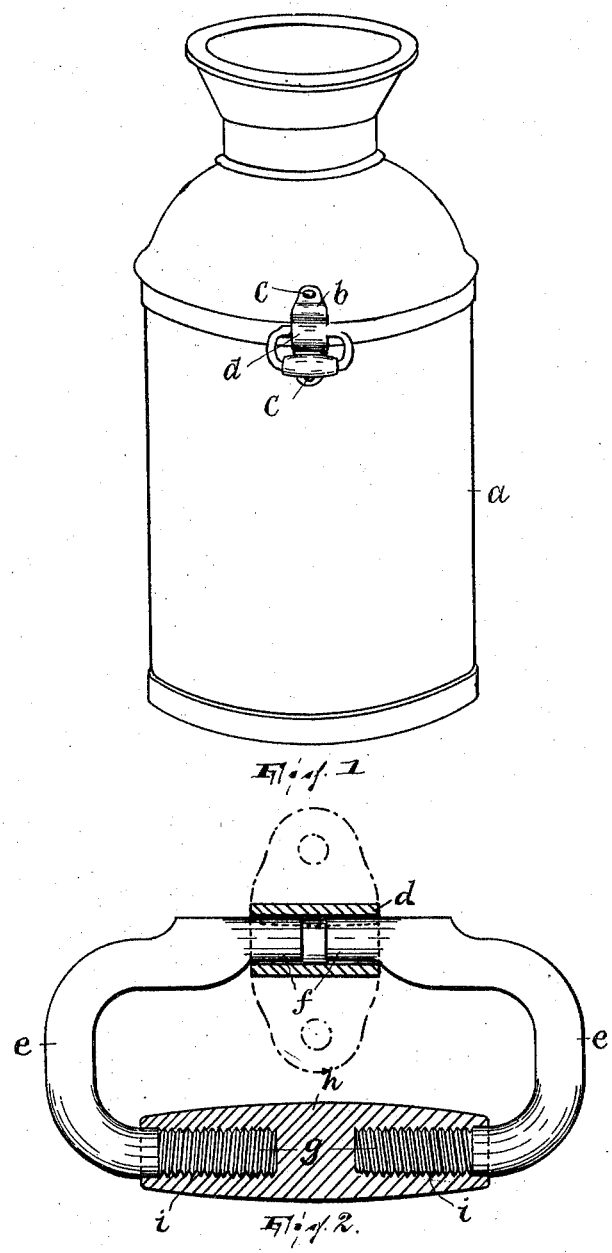
WITNESS
Wm L Bell
INVENTOR
David M. McDonald.
BY
John Stewart,
ATTORNEY.

UNITED STATES PATENT OFFICE.

DAVID M. McDONALD, OF PATERSON, NEW JERSEY.

HANDLE.

1,315,376. Specification of Letters Patent. Patented Sept. 9, 1919.

Application filed July 10, 1919. Serial No. 309,936.

*To all whom it may concern:*

Be it known that I, DAVID M. McDONALD, a citizen of the United States, residing at Paterson, in the county of Passaic and State of New Jersey, have invented certain new and useful Improvements in Handles, of which the following is a specification.

This invention relates to handles formed in the shape of a loop and adapted to be attached to the sides of certain containers, such, for example, as milk cans. Frequently these handles become broken or badly bent, due to hard usage, as in the case of milk cans, and as they are usually constructed—to wit, consisting of a loop having its ends overlapped by a sheet metal strap or ear riveted to the side of the can—they cannot be readily replaced. The object of this invention is to provide a handle of the loop type which will be so constructed that it may be attached to a can having straps or ears of substantially the type indicated by very simple manipulation, without special tools.

The accompanying drawing fully illustrates my invention,

Figure 1 being a side elevation of a can having the improved handle, and

Fig. 2 showing the handle and ear, the ear and part of the handle appearing in section.

The milk can $a$ has the strap $b$ for one of its handles secured thereto by rivets $c$, one at the top and the other at the bottom, in the usual way, the strap or ear being bent or arched at $d$ to afford the socket or bearing for the handle.

The handle comprises two shank members $e$ each bent into a generally U-shaped form, one end $f$ of each forming a pivot or bearing portion to be received by the bearing portion of the strap $b$, and the other, $g$, being screw-threaded. In a pair of these members one has its end $g$ threaded right-handed and the other left-handed. The handle further comprises a handle-proper or grip $h$, which is a plain substantially cylindrical member having threaded holes $i$ tapped into its opposite ends, and as the pair of members $e$ have their ends $g$ reversely threaded, as stated, these holes are also reversely threaded.

In order to assemble the improved handle with the can the handle proper $h$ is screwed onto the two threaded ends of the members $e$, and when their ends $f$ have been thus drawn more or less sufficiently close together still to admit the width of the strap between them they are placed so as to oppose the bearing of the latter and then the handle proper or grip $h$ is screwed up tight, drawing said ends $f$ into said bearings.

One feature of my invention in its preferred form consists in forming the handle so that in using the same the user's hand tends to screw up the handle proper or grip $h$ on the threaded ends of the members $c$. That is, viewing the handle from the outside, or in the normal way as it hangs on the can or other container, (Fig. 2 is an inside elevation), the threading then at the left of the handle will be right-hand threading and that at the right of the handle left-hand threading, so that to pick up the can by its handles and the tendency thereby to turn the handles proper results in a tendency to screw up the handles proper.

Having thus fully described my invention, what I claim as new and desire to secure by Letters Patent is:—

1. A handle consisting of a handle proper having opposite reversely threaded holes and a pair of substantially U-shaped members each having each end thereof opposed to one end of the other member, two such ends opposed to each other being reversely threaded and screwed into said holes and the other two ends forming attaching portions of said handle.

2. A handle consisting of a handle proper having opposite threaded holes, the right-hand hole being left-hand threaded and the left-hand hole right-hand threaded, and a pair of substantially U-shaped members each having each end thereof opposed to one end of the other member, two such ends opposed to each other being reversely threaded and screwed into said holes and the other two ends forming attaching portions of said handle.

In testimony whereof I affix my signature.

DAVID M. McDONALD.

Copies of this patent may be obtained for five cents each, by addressing the "Commissioner of Patents, Washington, D. C."